J. A. WILLIAMS.
SPRING HANGER.
APPLICATION FILED DEC. 15, 1913.

1,230,970.

Patented June 26, 1917.

WITNESSES:
Robert L. Bruck
Irene L. Stohlman

INVENTOR,
Joseph A. Williams,
By Hull & Smith,
ATTYS.

UNITED STATES PATENT OFFICE.

JOSEPH A. WILLIAMS, OF CLEVELAND, OHIO, ASSIGNOR TO THE K. W. IGNITION COMPANY, OF CLEVELAND, OHIO, A CORPORATION OF OHIO.

SPRING-HANGER.

1,230,970.  Specification of Letters Patent.  Patented June 26, 1917.

Application filed December 15, 1913. Serial No. 806,693.

*To all whom it may concern:*

Be it known that I, JOSEPH A. WILLIAMS, a citizen of the United States, residing at Cleveland, in the county of Cuyahoga and State of Ohio, have invented a certain new and useful Improvement in Spring-Hangers, of which the following is a full, clear, and exact description, reference being had to the accompanying drawings.

This invention relates to an improved spring hanger whereby the vibrating end of a vehicle spring may be yieldingly connected to an adjoining portion of the vehicle; and it has for its objects to provide a device of the above character which includes an auxiliary spring which acts to relieve the principal spring of quick and sudden shocks that would otherwise be transmitted through said spring to the vehicle body.

Further objects are to provide an elastic spring hanger which is extremely efficient; which responds freely to the longitudinal action of the principal spring; which is comparatively simple of construction; is economical of production; is very durable; and which can be readily applied to certain types of motor vehicle as a substitute for the ordinary spring hanger.

Figure 1:
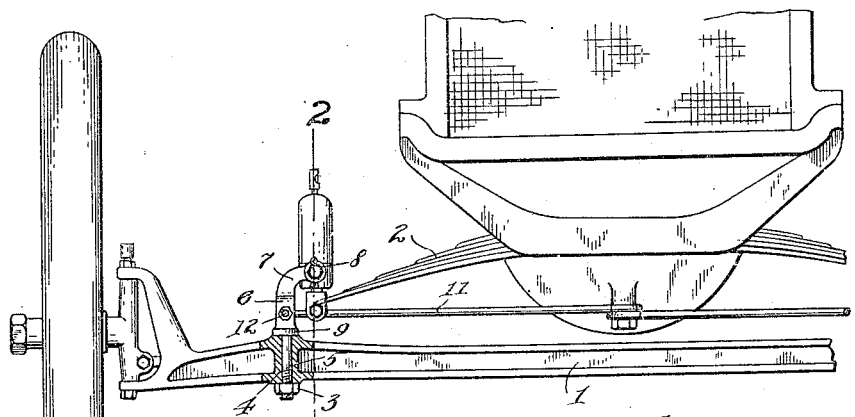
Figure 2:
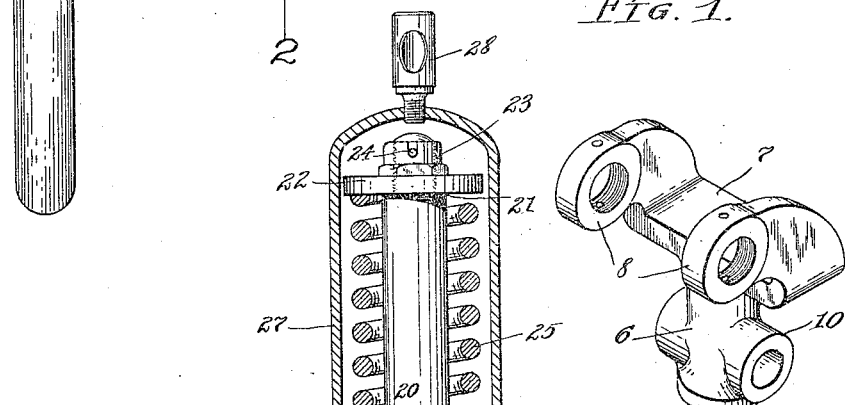
Figure 3:
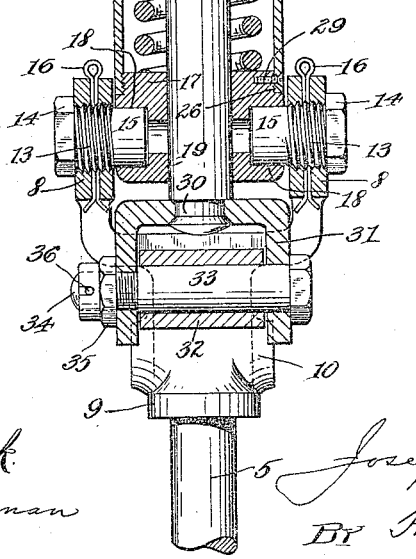

The above and further objects, which will become apparent as this description proceeds, are attained by a device constructed in accordance with the accompanying drawing, wherein Figure 1 is a partial front elevation of an automobile having my improved spring hanger applied thereto; Fig. 2 is a central, vertical section through the spring hanger as indicated by the line 2—2 of Fig. 1; and Fig. 3 is a perspective view of the fork which forms a part of the spring hanger.

In the drawings, 1 represents the front axle of a well known type of automobile, and it has connected thereto, through my improved elastic spring hanger, the end of the spring 2. While I have shown my invention as applied to only the front spring and axle of the automobile, it will be understood that the same is as well adapted for use with the rear spring thereof; and although I have elected a certain type of automobile for the purpose of showing the application of my invention, it is obvious that, with certain minor changes in design, the same can be made applicable to other prevailing types of automobiles.

Clamped by the nut 3 within the hole 4 of the front axle of the automobile, is the shank 5 of a post 6, which has a forked upper end 7, the branches whereof terminate in eyes 8. Intermediate the fork 7 and shoulder 9 which rests upon the top of the axle, the post is provided with a transverse cylindrical portion 10 having a central bore wherein the end of the radius rod 11 is secured by a nut 12, in the usual manner.

Threaded through each eye of the fork 7 is a screw 13 having a hexagon head 14 and a smooth extension 15. These screws are adapted to be locked in place, against rotation, by the cotter pins 16 which pass through the eyes 8 and through transverse holes in the threaded portions of the screws. Trunnioned upon the smooth extensions 15 of the screws is a circular block 17 which has recesses 18 for the reception of the screw extensions 15. The block 17 is also provided with a central vertical bore 19 through which is adapted to reciprocate a rod 20 having its upper end reduced and threaded to form a shoulder 21 against which the disk 22 may be securely clamped by a nut 23 screwed upon the threaded end of the rod and locked against rotation by a pin 24. Confined between the disk 22 and the upper circular face of the block 17 is a comparatively stiff coiled spring 25. It will be observed that the upper end of the block 17 is externally threaded at 26 for the application of the internally threaded end of the cylindrical casing 27, which casing serves to inclose and protect the spring 25 and the coöperating parts of the device, and also to provide a retainer for oil which may be introduced into the casing through the oil cap 28 which is applied to the closed top of the casing. This construction provides a very effective means of lubrication for the device. A tapered headed screw 29 passes through the lower edge of the casing and into the adjacent portion of the block 17 to lock said casing against turning.

Where the rod 20 projects below the block 17 it is reduced at 30 for the application of the yoke 31, the reduced end 30 being riveted after the yoke has been applied thereto.

The eye 32 of the spring 2 is journaled upon a bolt 33 which passes freely through one of the branches of the yoke 31 and has its reduced end 34 threaded through the other branch of the yoke, a nut 35 being applied to the projecting end 34 of the bolt for holding the bolt against displacement, said nut being held against rotation by a pin 36 which passes through the bolt and has its ends occupying notches in the nut.

It will be seen from the drawing that the weight of the vehicle body is such as will cause a slight depression of the spring 25, and also that the casing 27 normally stands substantially vertical. From such position, the swinging portion of the hanger is permitted to move freely upon its trunnions in either direction to compensate for the lengthening and shortening of the principal spring 2. In the operation of the device, should the wheel of the vehicle strike an obstruction, such as a stone, the wheel will ride up over said obstruction and transmit its movement to the block 17 through the axle 1 and the post 6. This will cause the spring 25 to be compressed between the upper face of the block 17 and the disk 22 and absorb the greater portion of such movement of the wheel, the portion transmitted to the rod being so small that it is practically taken up by the principal spring before it reaches the body of the vehicle.

Having thus described my invention, what I claim is:

1. A device of the character set forth comprising, in combination, a bracket adapted to be secured to a vehicle axle having a forked end, the branches whereof are provided with inwardly projecting trunnions, a member journaled upon said trunnions and having a substantially vertical bore, a rod which is adapted to reciprocate within said bore and having an abutment which is spaced from said member, an elastic member interposed between said member and the abutment, and connecting means carried by one end of said rod.

2. A device of the character set forth comprising, in combination, a forked bracket each branch whereof terminates in an internally threaded eye, a screw adapted to occupy each eye and having an inwardly projecting extension, a block trunnioned upon the screw extensions and having a substantially vertical bore, a rod adapted to reciprocate within said bore and having an abutment spaced in one direction from the aforesaid block, connecting means secured to the rod on the side of the block opposite the aforesaid abutment, and an elastic member interposed between the block and the abutment.

3. In a device of the character set forth, a bracket having a shank adapted to be attached in upright position upon an automobile part and having at its upper end a pair of offset fork arms, a trunnion carried by each arm, a block having a vertical bore, said block being pivoted upon said trunnions transversely of said bore, a rod projecting through said bore and adapted to reciprocate therein, a shouldered member carried by said rod above said block, a transverse pivot member carried by said rod below said block, and a compression spring interposed between said shouldered member and block, said pivot member being adapted to receive the end of a leaf spring.

4. A device of the character set forth comprising, in combination, a forked bracket the branches whereof are provided with opposed trunnions, a circular block pivoted with the trunnions of the bracket and having a substantially central vertical bore, a rod adapted to reciprocate within said bore and extending above and below the block, a disk secured to the upper end of the rod, an elastic member interposed between the disk and one of the circular faces of the aforesaid block, a yoke carried by the lower end of the rod, and a cylindrical casing which has its lower end threaded upon the upper end of the block and its opposite end closed.

5. A device of the character set forth comprising, in combination, a bracket having a shank adapted for attachment to the axle of an automobile and also having a pair of spaced branches, each of which terminates in an internally threaded eye, a screw within each eye which is provided with an inwardly projecting extension, a cylindrical block trunnioned upon the screw extensions and having a substantially central vertical bore, a rod adapted to reciprocate within said bore and extending above and below the block, a disk secured to the upper end of the rod, an elastic member interposed between the disk and one of the circular faces of the aforesaid block, and a yoke carried by the lower end of the rod, said yoke being adapted to receive one end of a vehicle spring and said bracket being offset so that said yoke may swing beneath said trunnions.

In testimony whereof, I hereunto affix my signature in the presence of two witnesses.

JOSEPH A. WILLIAMS.

Witnesses:
J. B. HULL,
BRENNAN B. WEST.